(12) United States Patent
Chin et al.

(10) Patent No.: US 8,880,102 B2
(45) Date of Patent: Nov. 4, 2014

(54) SYSTEM, METHOD AND COMPUTER READABLE STORAGE MEDIUM FOR STORING THEREOF FOR PROVIDING LOCATION-BASED SERVICE

(71) Applicant: Institute for Information Industry, Taipei (TW)

(72) Inventors: Shan Chin, New Taipei (TW); Feng-Sheng Wang, Tainan (TW)

(73) Assignee: Institute for Information Industry, Taipei (TW)

( * ) Notice: Subject to any disclaimer, the term of this patent is extended or adjusted under 35 U.S.C. 154(b) by 65 days.

(21) Appl. No.: 13/750,996

(22) Filed: Jan. 25, 2013

(65) Prior Publication Data

US 2014/0141809 A1 May 22, 2014

(30) Foreign Application Priority Data

Nov. 20, 2012 (TW) .............................. 101143302 A

(51) Int. Cl.
 *H04W 24/00* (2009.01)
 *H04W 4/02* (2009.01)
 *H04L 29/08* (2006.01)
 *H04W 4/00* (2009.01)

(52) U.S. Cl.
 CPC ............... *H04W 4/021* (2013.01); *H04L 67/34* (2013.01); *H04W 4/001* (2013.01)
 USPC ................... 455/456.3; 455/456.1; 455/404.2; 455/418; 455/440; 455/414.1

(58) Field of Classification Search
 USPC ............... 455/456.1–456.3, 404.2, 440, 418, 455/414.1, 419
 See application file for complete search history.

(56) References Cited

U.S. PATENT DOCUMENTS

| | | | |
|---|---|---|---|
| 7,072,672 B1 * | 7/2006 | Vanska et al. | 455/456.3 |
| 7,139,551 B2 * | 11/2006 | Jamadagni | 455/412.1 |
| 7,720,906 B2 * | 5/2010 | Brockway et al. | 709/203 |
| 8,045,455 B1 | 10/2011 | Agronow et al. | |
| 8,204,513 B2 | 6/2012 | Crowley et al. | |
| 2005/0222918 A1 * | 10/2005 | Vanska et al. | 705/26 |
| 2007/0281701 A1 * | 12/2007 | Cole et al. | 455/440 |
| 2010/0197219 A1 * | 8/2010 | Issa et al. | 455/3.06 |
| 2010/0248699 A1 * | 9/2010 | Dumais | 455/414.1 |
| 2012/0040681 A1 * | 2/2012 | Yan et al. | 455/440 |
| 2013/0005360 A1 * | 1/2013 | Issa et al. | 455/456.3 |
| 2013/0159995 A1 * | 6/2013 | Senot et al. | 717/178 |

* cited by examiner

*Primary Examiner* — Kamran Afshar
*Assistant Examiner* — Mong-Thuy Tran
(74) *Attorney, Agent, or Firm* — McClure, Qualey & Rodack, LLP

(57) ABSTRACT

A method for providing a location-based service is provided. The method comprises steps outlined below. A geometrical position of a mobile device is detected. A service area that the geometrical position locates is determined to further acquire the mobile device whether it has at least one corresponding application program that corresponds to the service area. The corresponding application program is provided to the mobile device when the mobile device does not have the corresponding application program.

12 Claims, 3 Drawing Sheets

SYSTEM, METHOD AND COMPUTER READABLE STORAGE MEDIUM FOR STORING THEREOF FOR PROVIDING LOCATION-BASED SERVICE

RELATED APPLICATIONS

This application claims priority to Taiwan Application Serial Number 101143302, filed Nov. 20, 2012, which is herein incorporated by reference.

BACKGROUND

1. Technical Field

The present disclosure relates to a location-based service technology. More particularly, the present disclosure relates to a system, a method and a computer readable storage medium for storing thereof for providing location-based service.

2. Description of Related Art

The mobile communication technologies allow users transmitting data in a wireless way. On the other hand, the global positioning system (GPS) or other positioning technologies such as the GLONASS system from Russia and the Galileo system from Europe allow the user receives the accurate positioning information by using the mobile communication technologies. Consequently, the user can easily inquire the location of his/her own position on the map by using the positioning software installed in the mobile device.

The development of the mobile communication and positioning technologies makes the location-based service now become popular. However, most of the current technologies can only provide the location-based service at a certain position with single way information such as the advertisement or text-informing message. The location-based service having diverse and interactive features is still rare to be seen.

Accordingly, what is needed is a system, a method and a computer readable storage medium for storing thereof for providing better location-based service.

SUMMARY

An aspect of the present invention is to provide a method for providing a location-based service. The method comprises steps outlined below. A geometrical position of a mobile device is detected. A service area that the geometrical position locates is determined to further acquire the mobile device whether it has at least one corresponding application program that corresponds to the service area. The corresponding application program is provided to the mobile device when the mobile device does not have the corresponding application program.

Another aspect of the present invention is to provide a system for providing a location-based service. The system comprises a mobile device and a server. The mobile device comprises a geometrical positioning module for detecting a geometrical position of the mobile device. The server comprises a network module, a storage module and a processing module. The storage module stores a plurality of application programs. The processing module receives information of the geometrical position of the mobile device through the network module to determine a service area that the geometrical position locates to further acquire the mobile device whether it has at least one corresponding application program that corresponds to the service area. When the mobile device does not have the corresponding application program, the processing module provides the corresponding application program from the storage module to the mobile device.

Yet another aspect of the present invention is to provide a non-transitory computer readable storage medium to store a computer program to execute method for providing a location-based service. The method comprises steps outlined below. A geometrical position of a mobile device is detected. A service area that the geometrical position locates is determined to further acquire the mobile device whether it has at least one corresponding application program that corresponds to the service area. The corresponding application program is provided to the mobile device when the mobile device does not have the corresponding application program.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
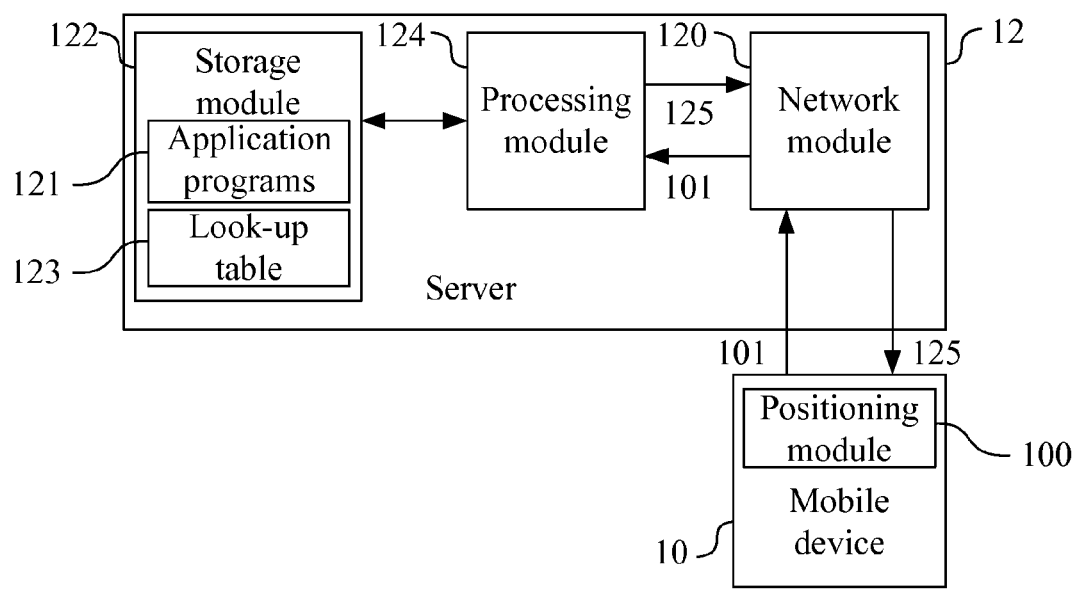
FIG. 1 is a block diagram of a system for providing a location-based service in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a system 1 for providing a location-based service in an embodiment of the present invention. The system 1 comprises a mobile device 10 and a server 12.

The mobile device 10 comprises a geometrical positioning module 100 for detecting a geometrical position of the mobile device 10. In an embodiment, the mobile device 10 can retrieve the coordinate on earth of its position by using the positioning systems such as the global positioning system (GPS), the GLONASS positioning system or the Galileo position system. The geometrical positioning module 100 can thus obtain the geometrical position of the mobile device 10 according to the retrieved coordinate.

The server 12 comprises a network module 120, a storage module 122 and a processing module 124.

The network module 120 allows the transmission of data between the server 12 and the mobile device 10 such that the server 12 can provide the location-based service to the mobile device 10 according to its geometrical position. It is noted that in the current example, only one mobile device 10 is depicted in FIG. 1. However, the number of the mobile device is not limited to the shown embodiment. The server 12 is able to provide the service to multiple mobile devices at the same time.

The processing module 124 can compare the geometrical position 101 provided by the mobile device 10 with a plurality of coverage areas of the system 1 to determine the service area that the mobile device 10 locates.

The storage module 122 stores a plurality of application programs 121 and a look-up table 123. The application programs 121 are interactive software that can be installed in the mobile device such that the user can operate the installed application programs 121 to receive or transmit network information. The look-up table 123 records a corresponding relation of the application programs 121 and the coverage areas.

The processing module 124 inquires the look-up table 123 according to the service area that the mobile device 10 locates to retrieve the information of at least one corresponding application program that corresponds to the service area. Furthermore, the processing module 124 acquires the mobile device 10 whether it has the corresponding application program. When the response of the mobile device 10 shows that it does not have the corresponding application program, the processing module 124 controls the network module 120 to inquire the look-up table 123 according to the information of the service area to provide the corresponding application program 125 from the storage module 122 to the mobile device 10. It is noted that in different embodiments, the number of the corresponding application program 125 that corresponds to a certain service area can be different and is not limited to a specific number.

It is noted that in an embodiment, the processing module 124 can provide the corresponding application program 125 according to not only the information of the service area but also the information of the user attribute received from the mobile device 10. Hence, the provided application program can match the need of the user. The user attribute may comprise the attribute such as, but not limited to, a user history that records the application programs that the user had downloaded before, the authority of the user to access the application programs and the preference setting of the user. In different embodiments, the mobile device 10 can transmit the user attribute to the server 12 by using different interfaces such as, but not limited to, a virtual desktop.

In an embodiment, the mobile device 10 displays the service area that it locates and the list of downloaded corresponding application programs 125 on its display module (not shown) for the user's reference after receiving the corresponding application program 125.

In an embodiment, after it provides the corresponding application program 125 to the mobile device 10, the processing module 124 keeps determining whether the geometrical position of the mobile device 10 has changed such that the mobile device 10 leaves the service area and the time period that it leaves. In an embodiment, when the mobile device 10 leaves the service area, the processing module 124 immediately informs the mobile device 10 that it already leaves the service area to let the mobile device 10 remove the corresponding application program 125. In another embodiment, the processing module 124 informs the mobile device 10 to remove the corresponding application program 125 when it leaves the service area for a specific time period.

In an embodiment, when the processing module 124 determines that the mobile device 10 already has the corresponding application program 125, the processing module 124 further acquires the mobile device 10 the number of time that the corresponding application program 125 has been downloaded to the mobile device. When the number of times exceeds a specific number, the processing module 124 informs the mobile device 10 to keep the corresponding application program 125 even if it leaves the service area.

Figure 2:
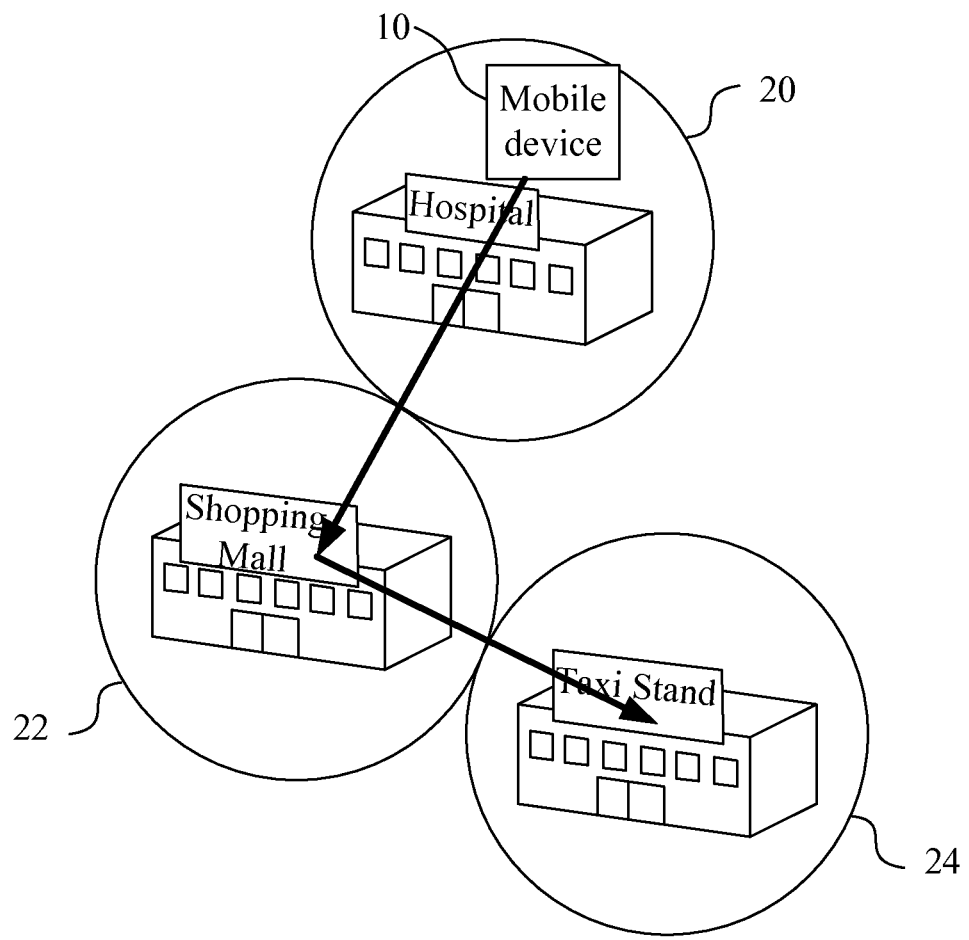
FIG. 2 is a diagram of the mobile device and the service areas in an embodiment of the present invention.

FIG. 2 is a diagram of the mobile device 10 and the service areas 20, 22 and 24 in an embodiment of the present invention. In the present embodiment, the service area 20 is an area having a hospital, the service area 22 is an area having a shopping mall and the service area 24 is an area having a taxi stand.

When the system 1 detects that the mobile device 10 enters the service area 20 by using the method described above, the system 1 can provide the application programs related to the hospital such as, but not limited to, an online registration program, a program for checking the number of registered patient, a program for inquiring the distribution of the wards or a health information referencing program to the mobile device 10.

When the system 1 detects that the mobile device 10 leaves the service area 20 and enters the service area 22, the system 1 control the mobile device 10 to remove the programs related to the hospital and provides the programs related to the shopping mall such as, but not limited to, an online ordering program or a program for previewing the samples of the merchandises to the mobile device 10.

When the system detects that the mobile device 10 leaves the service area 22 and enters the service area 24, the system 1 control the mobile device 10 to remove the programs related to the shopping mall and provides the programs related to the taxi stand such as, but not limited to, a program for calling the taxi or a program for inquiring the schedule of the taxis to the mobile device 10.

The system of the present invention is thus able to determine the service area that the mobile device locates according to its geometrical position and provide the corresponding application program to the mobile device. The user does not need to select the application program to download them manually.

Figure 3:
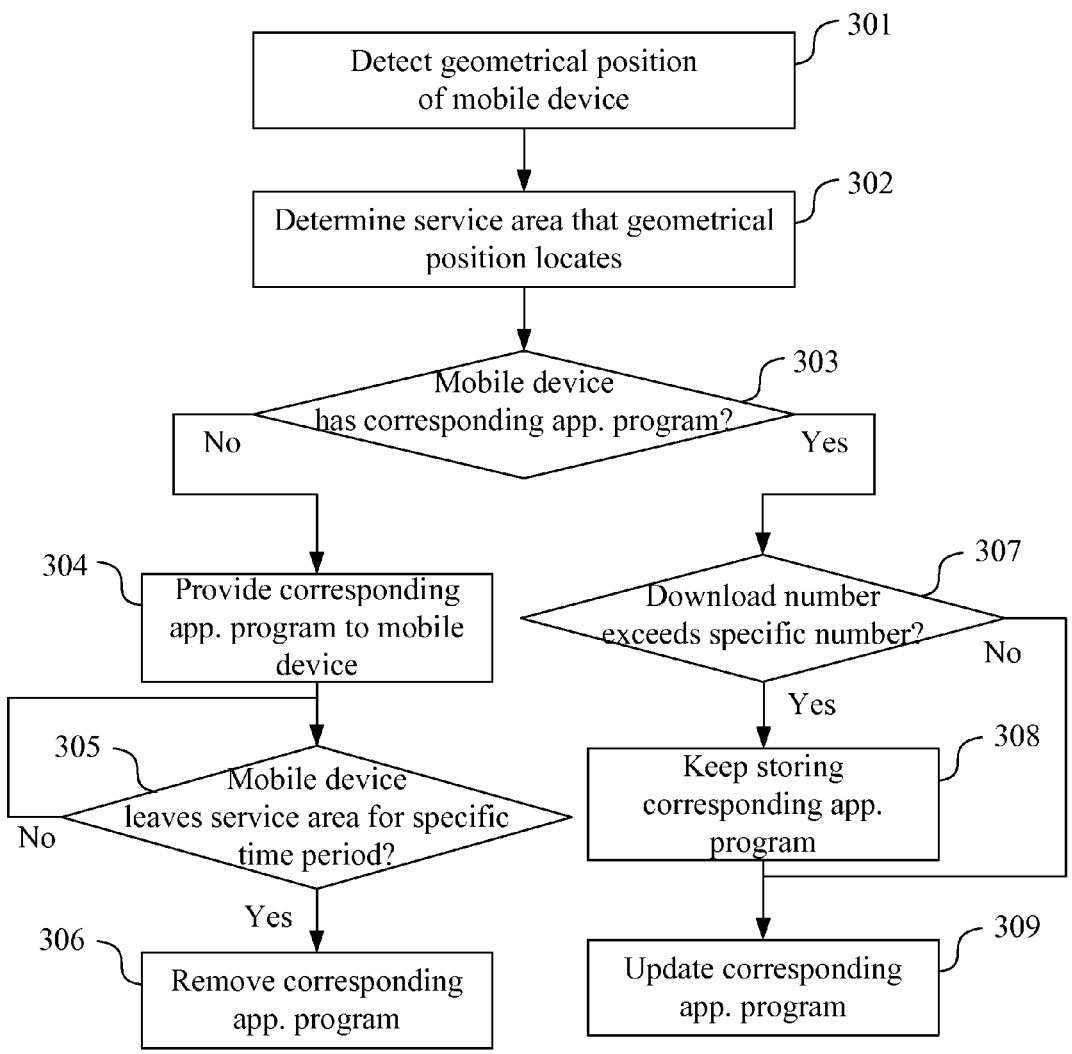
FIG. 3 is a flow chart of a method for providing a location-based service in an embodiment of the present invention.

FIG. 3 is a flow chart of a method 300 for providing a location-based service in an embodiment of the present invention. The method 300 can be used in the system 1 depicted in FIG. 1. More specifically, the method for providing the location-based service is implemented by using a computer program to control the modules in the system 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The method 300 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the geometrical positioning module 100 of the mobile device 10 detects a geometrical position of the mobile device 10.

In step 302, the processing module 124 of the server 12 determines service area that the geometrical position locates.

In step 303, the processing module 124 acquires the mobile device 10 whether it has at least one corresponding application program that corresponds to the service area.

When the mobile device 10 does not have the corresponding application program, the processing module 124 provides the corresponding application program to the mobile device 10 in step 304.

In step 305, the processing module 124 further determines whether the geometrical position of the mobile device 10 has changed such that the mobile device 10 leaves the service area for a specific time period.

When the processing module 124 determines that mobile device 10 does not leave the service area for the specific time period, the flow goes back to step 305. When the processing module 124 determines that mobile device 10 leaves the service area for the specific time period, the processing module 124 controls the mobile device 10 to remove the corresponding application program 125 in step 306.

When the processing module 124 determines that the mobile device 10 has the corresponding application program in step 303, the processing module 124 further determines whether the number of times that the corresponding application program has been downloaded to the mobile device 10 exceeds a specific number in step 307.

When the number of times exceeds the specific number, the mobile device 10 continues to store the corresponding application program 125 in step 308.

In an embodiment, no matter the determination result of step 307, a step 309 is followed to update the corresponding application program 125 to keep updating the corresponding application program 125 to the latest version.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for providing a location-based service (LBS) comprising:
   detecting a geometrical position of a mobile device;
   determining a service area that the geometrical position locates to further acquire the mobile device whether it has at least one corresponding application program that corresponds to the service area;
   providing the corresponding application program to the mobile device when the mobile device does not have the corresponding application program;
   determining whether the geometrical position of the mobile device has changed such that the mobile device leaves the service area;
   determining whether a number of times that the corresponding application program has been downloaded to the mobile device exceeds a specific number;
   controlling the mobile device to remove the corresponding application program when the number of times does not exceed the specific number and the geometrical position of the mobile device has changed such that the mobile device leaves the service area; and
   controlling the mobile device to continue to store the corresponding application program when the number of times exceeds the specific number.

2. The method of claim 1, further comprising:
   determining whether the geometrical position of the mobile device has changed such that the mobile device leaves the service area for a specific time period; and
   controlling the mobile device to remove the corresponding application program when the geometrical position of the mobile device has changed such that the mobile device leaves the service area for the specific time period.

3. The method of claim 1, further comprising a step of providing the corresponding application program to the mobile device according to the service area and a user attribute.

4. A system for providing a location-based service comprising:
   a mobile device comprising a geometrical positioning module for detecting a geometrical position of the mobile device; and
   a server comprising:
   a network module;
   a storage module for storing a plurality of application programs; and
   a processing module for receiving information of the geometrical position of the mobile device through the network module to determine a service area that the geometrical position locates to further acquire the mobile device whether it has at least one corresponding application program that corresponds to the service area;
   wherein when the mobile device does not have the corresponding application program, the processing module provides the corresponding application program from the storage module to the mobile device,
   wherein the processing module determines whether the geometrical position of the mobile device has changed such that the mobile device leaves the service area, and determines whether a number of times that the corresponding application program has been downloaded to the mobile device exceeds a specific number,
   wherein when the number of times does not exceed the specific number and the geometrical position of the mobile device has changed such that the mobile device leaves the service area, the processing module controls the mobile device to remove the corresponding application program,
   when the number of times exceeds the specific number, the processing module controls the mobile device to continue to store the corresponding application program.

5. The system of claim 4, wherein the processing module further determines whether the geometrical position of the mobile device has changed such that the mobile device leaves the service area for a specific time period so as to control the mobile device to remove the corresponding application program when the geometrical position of the mobile device has changed such that the mobile device leaves the service area for the specific time period.

6. The system of claim 4, wherein the processing module controls the network module to provide the corresponding application program to the mobile device according to the service area and a user attribute.

7. The system of claim 4, wherein the geometrical positioning module detects the geometrical position according to a position coordinate from a global positioning system (GPS), a GLONASS positioning system or a Galileo position system.

8. The system of claim 4, wherein the storage module further stores a look-up table to record a corresponding relation of the plurality of application programs and a plurality of coverage areas such that the processing module actually inquires the look-up table according to the service area to further acquire the mobile device whether it has at least one corresponding application program that corresponds to the service area.

9. The system of claim 4, wherein the processing module controls the network module to provide the corresponding application program to the mobile device from the plurality of application programs according to the service area and the look-up table.

10. A non-transitory computer readable storage medium to store a computer program to execute method for providing a location-based service, wherein the method comprises:

detecting a geometrical position of a mobile device;

determining a service area that the geometrical position locates to further acquire the mobile device whether it has at least one corresponding application program that corresponds to the service area;

providing the corresponding application program to the mobile device when the mobile device does not have the corresponding application program;

determining whether the geometrical position of the mobile device has changed such that the mobile device leaves the service area;

determining whether a number of times that the corresponding application program has been downloaded to the mobile device exceeds a specific number;

controlling the mobile device to remove the corresponding application program when the number of times does not exceed the specific number and the geometrical position of the mobile device has changed such that the mobile device leaves the service area; and controlling the mobile device to continue to store the corresponding application program when the number of times exceeds the specific number.

11. The non-transitory computer readable storage medium of claim 10, wherein the method further comprises:

determining whether the geometrical position of the mobile device has changed such that the mobile device leaves the service area for a specific time period; and controlling the mobile device to remove the corresponding application program when the geometrical position of the mobile device has changed such that the mobile device leaves the service area for the specific time period.

12. The non-transitory computer readable storage medium of claim 10, wherein the method further comprises a step of providing the corresponding application program to the mobile device according to the service area and a user attribute.

* * * * *